No. 785,422. PATENTED MAR. 21, 1905.
O. E. HAMMOND.
ATTACHMENT FOR WORKING BUTTONHOLES.
APPLICATION FILED OCT. 12, 1903.
2 SHEETS—SHEET 1.
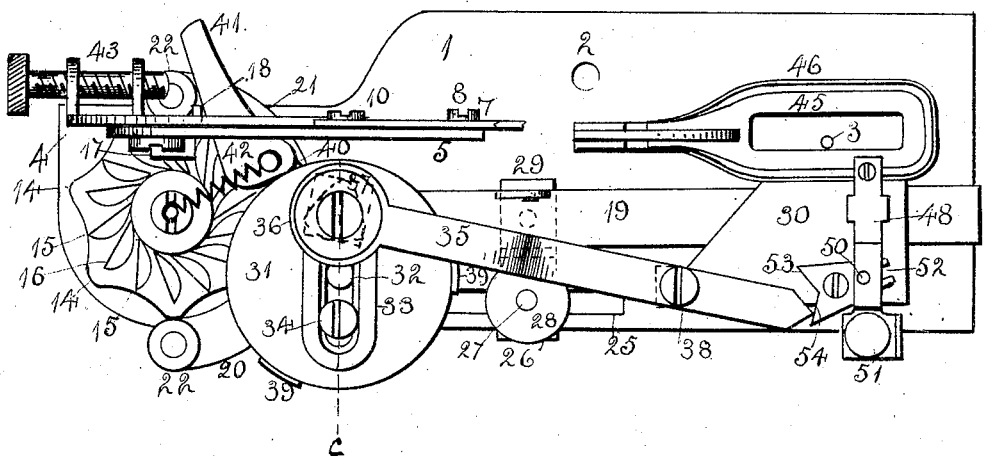
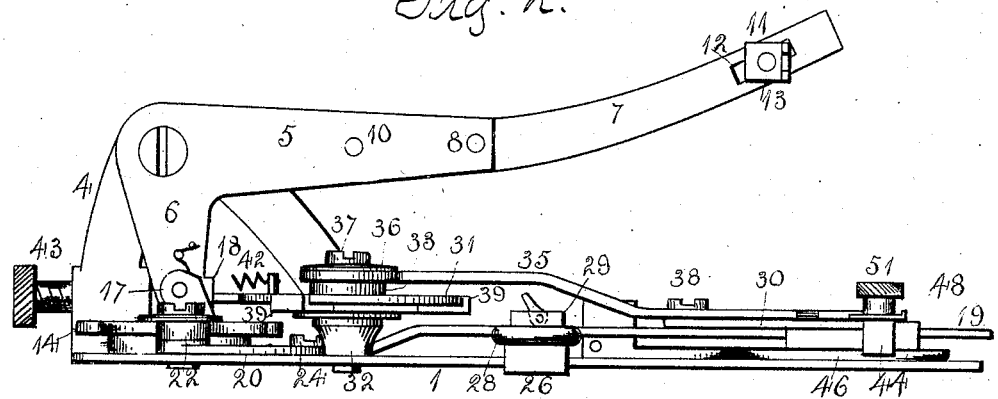
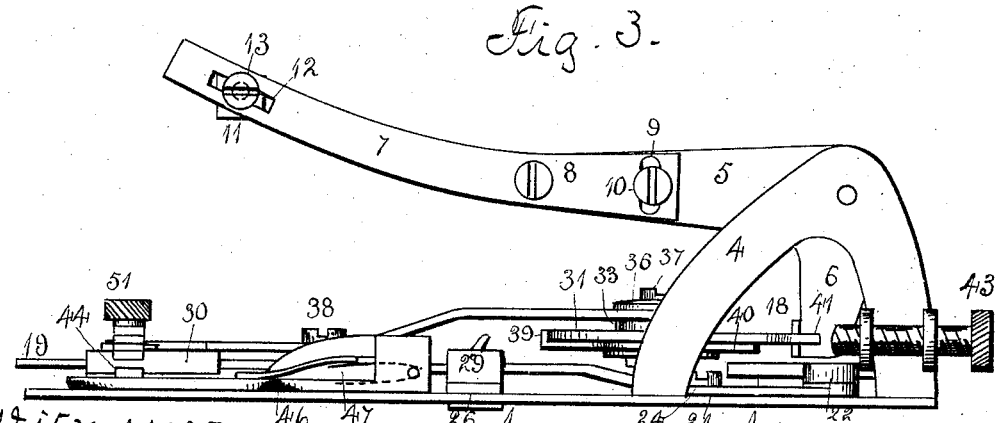
Witnesses:
H. Schreiber
E. Behel.
Inventor:
Owen E. Hammond
By A. O. Behel
Atty.

No. 785,422. PATENTED MAR. 21, 1905.
O. E. HAMMOND.
ATTACHMENT FOR WORKING BUTTONHOLES.
APPLICATION FILED OCT. 12, 1903.

2 SHEETS—SHEET 2.

Witnesses:
H. Schreiber.
E. Behel.

Inventor:
Owen E. Hammond
By A. O. Behel.
Atty.

No. 785,422.        Patented March 21, 1905.

UNITED STATES PATENT OFFICE.

OWEN E. HAMMOND, OF BELVIDERE, ILLINOIS.

ATTACHMENT FOR WORKING BUTTONHOLES.

SPECIFICATION forming part of Letters Patent No. 785,422, dated March 21, 1905.

Application filed October 12, 1903. Serial No. 176,737.

*To all whom it may concern:*

Be it known that I, OWEN E. HAMMOND, a citizen of the United States, residing at Belvidere, in the county of Boone and State of Illinois, have invented certain new and useful Improvements in Attachments for Working Buttonholes, of which the following is a specification.

The object of this invention is to construct an attachment for working buttonholes in which buttonholes varying in length and width can be worked with a variable length of stitch; also, the number of stitches to a given length can be varied.

The further object is to produce a round-end buttonhole.

My attachment has a series of movements which are adjustable and operated by a single attachment with the needle-bar of the sewing-machine.

One of the adjustments consists in varying the length of buttonhole, another adjustment for varying the distance between the stitches, another adjustment for varying the length of the stitch, and another adjustment for varying the distance between the two side rows of stitches in order that more or less cutting-space may be left.

Figure 4:
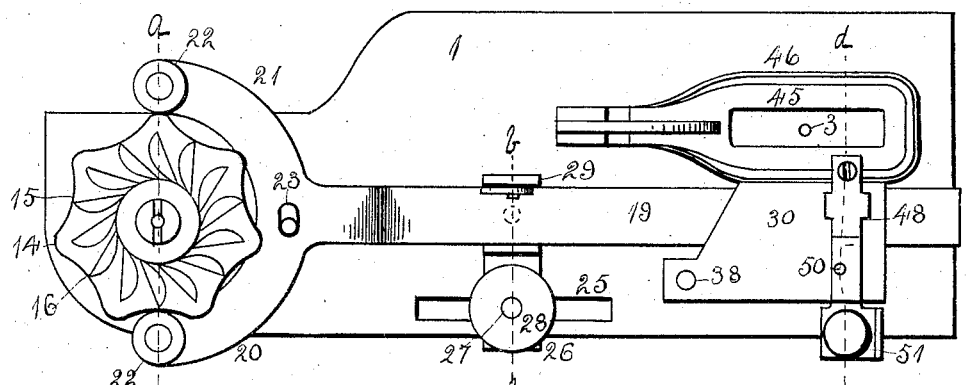
Figure 5:
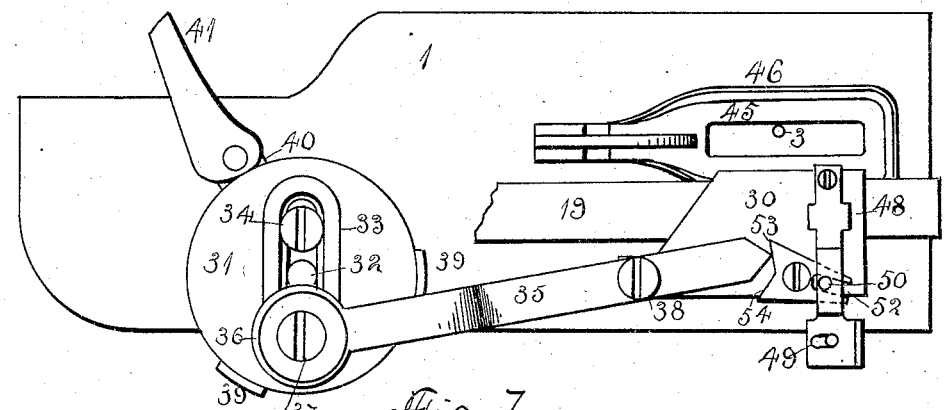
Figure 6:
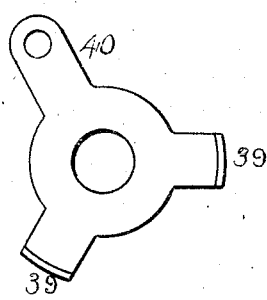
Figure 7:
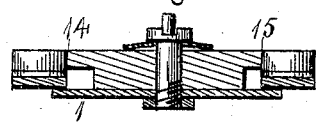
Figure 8:
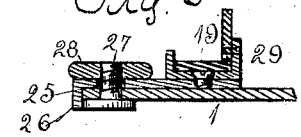
Figure 9:
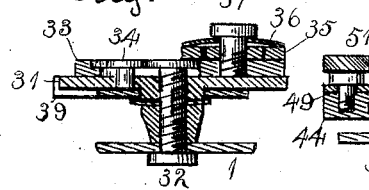
Figure 10:
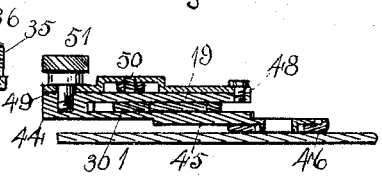

In the accompanying drawings, Figure 1 is a plan view of my improved attachment. Fig. 2 is an elevation. Fig. 3 is an elevation of the reverse side to that shown at Fig. 2. Fig. 4 is a plan view of the mechanism for producing the length of stitch. Fig. 5 is a plan view of the mechanism for giving the length and width of buttonhole. Fig. 6 is a face representation of the arm supporting the cam-lever. Fig. 7 is a section on dotted line $a$, Fig. 4. Fig. 8 is a section on dotted line $b$, Fig. 4. Fig. 9 is a section on dotted line $c$, Fig. 1. Fig. 10 is a section on dotted line $d$, Fig. 4.

All the various movements are supported by a single base-plate 1, which may be connected to the sewing-machine top plate by a screw passing through the opening 2, which will locate the hole 3 in proper adjustment with the needle.

To the base-plate is connected a bracket 4, to which is pivoted a bell-crank lever composed of the arms 5 and 6. The arm 5 extends in the lengthwise direction of the base-plate and has an extension 7 connected to its free end by the pivot-point 8 and the slotted end 9, through which a screw 10 passes. The free end of the extension has a forked clamp 11 movably connected to it by the slot 12 and screw 13.

By means of the slot 12 the fork can be brought into connection with the needle-bar, and by means of the slot 9 the fork can be adjusted vertically to bring it into proper position to make the connection with the needle-bar.

To the base-plate is pivoted a star-shaped wheel, having its periphery provided with alternate projections 14 and depressions 15. The upper face of this wheel is provided with radial ratchet-teeth 16. To the free end of the arm 6 of the bell-crank lever is pivoted a spring-actuated dog 17, which engages the teeth 16 of the star-shaped wheel as the arm is oscillated by the reciprocation of the needle-bar. This arm has a projection 18 for a purpose to appear hereinafter.

A lever 19 has two forks 20 and 21, each supporting a roller 22 engaging the periphery of the star-shaped wheel, one located diametrically opposite the other. A slot 23 extends transversely of the lever 19, and a screw 24 passes through the slot and connects the lever to the base-plate. A slot 25 is formed through the base-plate and extends in its lengthwise direction. A plate 26 has one edge bent down over the edge of the base-plate, and a screw 27 extends up through the slot 25, receiving a thumb-nut 28 at its upper end, thereby clamping the plate in connection with the base-plate and in a manner to permit the plate to be adjusted bodily in the lengthwise direction of the slot 25. This plate has a forked bar 29 pivoted to its inner end and receives the lever 19. As the star-wheel is intermittently rotated the projections of the wheel will alternately engage the rollers 22, thereby oscillating the lever 19, the pivot of the forked bar 29 acting as the pivotal center of the lever 19, and by adjusting the fork 29 in the lengthwise direction of the lever 19 the oscillations of the free end of the lever may be lengthened or shortened.

The free end of the lever 19 has a slide 30 mounted thereon capable of being moved in the lengthwise direction of the lever.

A disk 31 is loosely mounted on a stud 32, connected to the base-plate, the stud extending above the disk. A slotted bar 33 is located in connection with the disk, the slot receiving the stud 32, and a screw 34 passes through the slot, thereby clamping the bar in connection with the disk. To one end of the bar 33 is pivoted a link 35 and held in connection therewith by the washer 36 and screw 37. This link 35 has a pivotal connection with the slide 30 at the point 38, and the extreme end of the link is pointed.

Beneath the disk 31 around the stud 32 is located a spider-arm consisting of two upturned portions 39 and a horizontal portion 40. The upward portions engage the periphery of the disk 31. A cam-lever 41 has a pivotal connection with the horizontal arm 40. A coiled spring 42 has one end connected to the stud supporting the star-shaped wheel and its other end connected to the pivot-pin of the cam-lever.

As the arm 6 of the bell-crank lever oscillates the projection 18, extending therefrom, will engage the longer arm of the cam-lever and move it, and the coiled spring will return it. A slight advancement of this cam-lever will cause the shorter arm of the lever to impinge against the periphery of the disk 31 and bring the two upturned portions 39 against the periphery of the disk, so that the points of contact of the arm and upturned portions will be equal distance apart, thereby grasping the disk firmly, and the further advancement of the cam-lever will carry the disk with it, imparting an intermittent rotary movement to the disk.

By means of the screw 43, supported by the bracket 4 and being located in the path of the movement of the cam-lever 41, it is evident that the return movement of the cam-lever can be limited, which will allow a portion of the advancing movement of the projection 18 to be made before it engages the cam-lever, thereby limiting the movement imparted to the disk.

As the link 35 has a pivotal connection with the disk through the bar 33 at the center of the disk, it is evident that the link will be given a lengthwise movement equal to twice the distance between the pivot of the link and the center of the disk. This lengthwise movement of the link will reciprocate the slide on the lever 19. By means of the slot in the bar 33 the pivotal point of the link can be adjusted to give more or less movement to the link.

A forked guide 44 has its branches located in the cross-grooves in the slide 30, and to the free end of the lower branch is connected the upper section 45 of the cloth-clamp. The cloth-clamp is composed of the lower section 46 and the upper section 45 connected together at one end in a manner that they may be separated at their free ends. A spring 47 is located between the sections of the cloth-clamp, and when the upper section is raised the lower section will be held against the base-plate in order that the cloth may be placed between them. Both sections of the cloth-clamp have central openings.

A plate 48 has a pivotal connection with the upper branch of the forked guide near its free end and has its other end provided with a slot 49, and near its free end is located a pin 50 depending from its under face. A screw 51 passes through the slot 49 into the forked guide.

To the upper face of the slide 30 is pivoted a trip having a radial slot 52 and a wedge-shaped recess.

During the movement of the link from one extreme end to the other its pointed end will travel from the center of the wedge-shaped recess out along one of the surfaces and back, and in the return movement of the link its pointed end will travel out and back over the other surface. This movement of the trip will move the pin 50, and consequently move the forked slide back and forth, carrying the cloth-clamp with it.

The oscillatory movement of the free end of the lever carries the cloth held by the clamp back and forth, giving the length of the stitch. The movement of the slide 30 on the lever 19 moves the clamp in the lengthwise direction of the buttonhole and the trip rounds the corners. As each of the movements have been separately explained, their combined movements will be readily understood.

By means of the screw 43 the distance between the stitches can be regulated, by means of the adjustable fork 29 the length of the stitch can be changed, by means of the slotted plate 33 the length of the buttonhole can be determined, and by means of the slotted plate 48 the distance between the two side rows of stitching can be varied.

By this construction of attachment all adjustments are provided for to meet the requirements as to cloth and thread employed.

I claim as my invention—

1. In a buttonhole-working attachment, the combination of a clamp for holding cloth, means for moving the clamp in its lengthwise direction step by step, comprising a rotatable disk, a plate having a central opening larger than its pivotal support and having two sections engaging the periphery of the disk, a cam-lever carried by the plate and engaging the periphery of the disk about midway between the two sections, means for moving the cam-lever, and a connection between the disk and clamp.

2. In a buttonhole-working attachment, the combination of a clamp for holding cloth, means for moving the clamp in its lengthwise direction step by step, comprising a rotatable disk, a plate having a central opening larger than its pivotal support and having two sections engaging the periphery of the disk, a cam-lever carried by the plate and engaging the periphery of the disk about midway between the two sections, means for moving the cam-lever, an adjustable stop limiting the return movement of the lever, a connection between the disk and clamp and a spring acting upon the lever for returning it.

3. In a buttonhole-working attachment, the combination of a clamp for holding cloth and means for moving the clamp transversely to its length, comprising a support provided with a guideway, a guide located and movable in the guideway and having a connection with the clamp, a trip having a pivotal connection with the support and with the guide, and means for moving the trip.

4. In a buttonhole-working attachment, the combination of a clamp for holding cloth, means for moving the clamp transversely its length, comprising a support provided with a guideway, a guide located and movable in the guideway and having a connection with the clamp, a trip having a pivotal connection with the support, and provided with a radially-extending slot, a plate having a pivotal connection with the guide, means for clamping the plate to the guide in an adjustable manner, a pin extending from the plate entering the slot, and means for moving the trip.

5. In a buttonhole-working attachment, the combination of a clamp for holding cloth, means for moving the clamp transversely to its length, comprising a support provided with a guideway, a guide located and movable in the guideway and having a connection with the clamp, a trip having a pivotal connection with the guide, the trip having a V-shaped recess, a pivoted bar having a pointed end, and the pointed end of the bar located in the recess and movable in a manner to throw the trip, thereby moving the guide and means for moving the bar.

6. In a buttonhole-working attachment, the combination of a base-plate, a lever extending in the lengthwise direction of the plate and having a pivotal connection between its ends with the base-plate, means for oscillating the lever, a slide supported by and movable in the lengthwise direction of the lever, a cloth-clamp located parallel with the lever and connected to the slide, means for moving the slide step by step, and means for moving the clamp transversely to its length, comprising a support provided with a guideway, a guide located and movable in the guideway and having a connection with the clamp, a trip having a pivotal connection with the support and with the guide, and means for moving the trip.

7. In a buttonhole-working attachment, the combination of a base-plate, a lever comprising a main section and a forked end, a cam-wheel located within the forked end with which the forked ends engage, means for intermittently rotating the cam-wheel, a connection between the lever and base-plate holding the lever against lengthwise movement, a pivotal connection between the main portion of the lever and base-plate, a slide supported by and movable in the lengthwise direction of the main portion of the lever, a cloth-clamp connected to the slide and located to one side of and parallel with the lever, means for moving the slide step by step, and means for moving the clamp transversely to its length, comprising a support provided with a guideway, a guide located and movable in the guideway and having a connection with the clamp, a trip having a pivotal connection with the support and with the guide, and means for moving the trip.

OWEN E. HAMMOND.

Witnesses:
A. O. BEHEL,
E. BEHEL.